June 16, 1925.  S. ZGLICZYNSKI  1,542,433

AUTOMATIC WIND MOTOR

Filed May 20, 1924

Inventor

Stefan Zgliczynski

Patented June 16, 1925.

1,542,433

UNITED STATES PATENT OFFICE.

STEFAN ZGLICZYNSKI, OF BALTIMORE, MARYLAND.

AUTOMATIC WIND MOTOR.

Application filed May 20, 1924. Serial No. 714,565.

*To all whom it may concern:*

Be it known that I, STEFAN ZGLICZYNSKI, a citizen of the United States of America, residing at Baltimore, in the county of Baltimore City and State of Maryland, have invented certain new and useful Improvements in Automatic Wind Motors, of which the following is a specification.

This invention relates to new and useful improvements in automatic wind motors.

An important object of the invention is to provide a wind motor of the feathering blade type, with means for controlling the speed of the shaft, supporting the said blades.

A still further object of the invention is to provide means for controlling a plurality of feathering blades, for a wind wheel, whereby the blades may be successively put out of operation, while travelling in the direction of movement of air, for reducing the speed of the power shaft, carrying said blades.

A still further object of the invention is to provide both automatic and manual means for controlling the operation of the blades.

Other objects and advantages of the invention will be apparent during the course of the following description.

Figure 1:
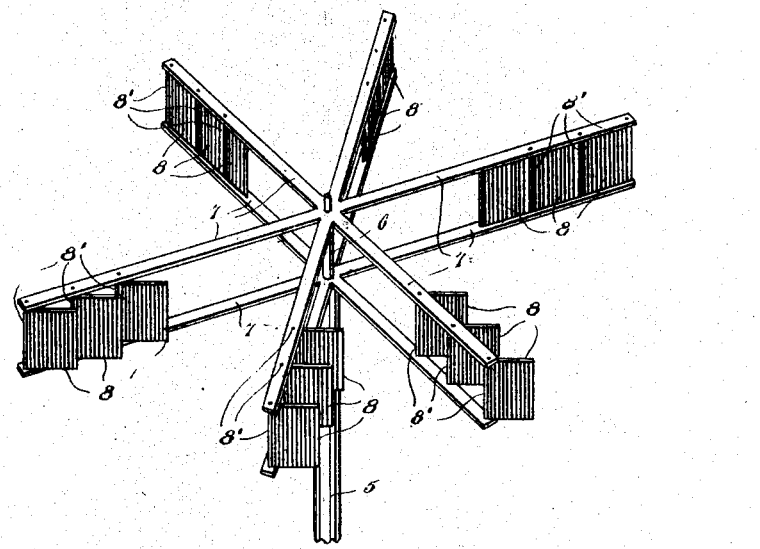
Figure 2:
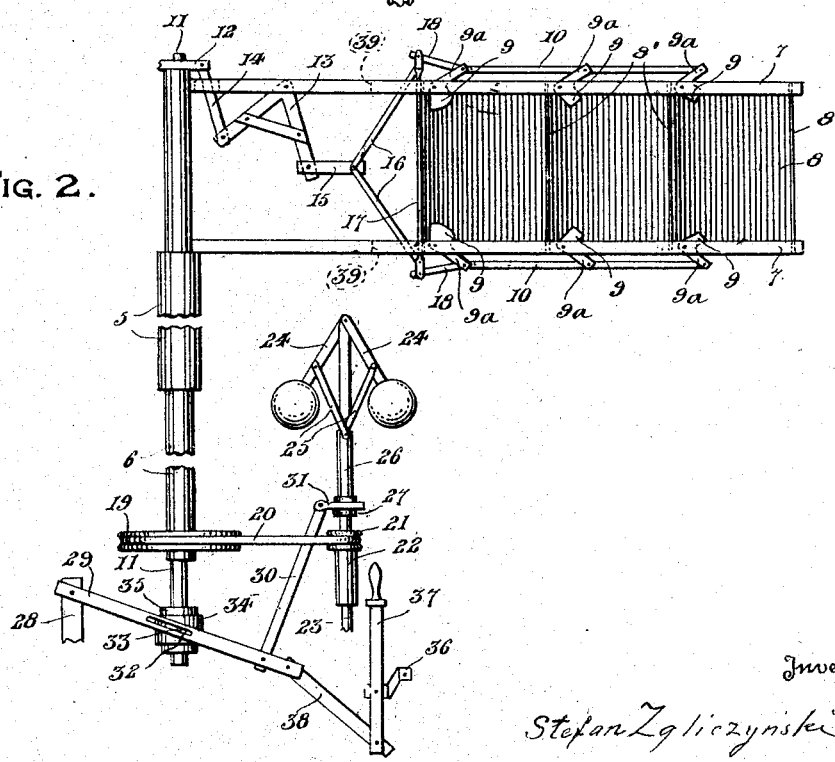

In the accompanying drawing forming a part of this specification, and in which like numerals are employed to designate like parts throughout the same, Figure 1 is a perspective view of the invention illustrating the type of wind wheel embodying this improved form of control, and Figure 2 is a fragmentary elevational view of a portion of the wind wheel illustrated in Figure 1, and shows the controlling means for the feathering blades.

In the drawing, wherein for the purpose of illustration, is shown a preferred embodiment of this invention, the numeral 5 designates a fixed tubular bearing within which is rotatably mounted a hollow shaft, 6. The portion of this shaft that projects above the bearing 5, is provided with two sets of radial arms 7, each set being formed of any desired number of arms, with the respective arms of one set arranged in vertical alignment with the respective arms of the second set. Pivotally connected to the outer end portions of each vertically aligned pair of arms, are any desired number of blades 8 which may be of flat formation, semi-cylindrical formation, or reversely curved formation.

It will be seen, by inspecting Figure 1, that the blades carried by each pair of vertically aligned arms are intended to extend longitudinally of said arms, when travelling before the wind, and to extend substantially at right angles to said arms, when travelling against the wind. For the purpose of retaining the blades 8 in longitudinal alignment with the arms, each blade is provided with a pair of abutments 9, one of each pair of abutments being connected to each of the arms 7. It will be noted, by inspecting Figure 2, that these abutments are of substantially bell-crank formation, and have arm portions $9^a$ which are connected by rods 10. The abutments for the different blades carried by each pair of arms, are of increasing size, as the blades approach the hollow shaft 6.

Extending axially through the hollow shaft 6, is a rod 11, which has secured to its upper end, a plurality of arms 12, extending radially from said rod, and arranged to extend in vertical alignment with each pair of arms. The upper arm of each pair has pivotally connected thereto, a bell-crank lever, 13, having one arm connected to one of the arms 12, by means of a link 14. The opposite arm of the bell-crank lever 13, is provided with a pivoted link 15, having the arms 16 diverging therefrom for connection with the opposite ends of a rod 17, that is connected by the links 18 to the rods 10.

Suitably keyed to the lower end of the hollow shaft 6, is a pulley wheel 19 that is intended to receive the belt 20, engaging the small pulley wheel 21, mounted upon the sleeve 22. This sleeve is keyed to a rotatable shaft 23, that has pivotally mounted upon its upper end, a pair of weighted, governor arms 24. Each of these arms is provided with a link 25, that is pivotally connected to a sleeve 26, having a grooved collar 27, rigidly mounted thereon. A rigid bracket arm 28 is mounted in proximity to the rod 11, and has pivotally connected thereto a lever 29, which is provided with a link 30 that carries a yoke 31 adapted for engaging the groove of the collar 27. An elongated slot 32 is formed in the lever 29, and receives a pin 33 which is formed integrally with a collar 34, that is loosely mounted upon the rod 11, and is prevented from moving longitudinally of this rod, by the rings 35 which are pinned to the said rod. A second fixed bracket 36 is mounted in proximity to the outer end of the lever 29, and is employed for pivotally supporting a manually operable lever 37 that has a link 38 connected to its lower end. This link is connected at its free end, to the outer end of the lever 29 in proximity to the link 30.

It will now be seen that the abutments 9 will operate for holding the blades 8 in their operative positions, while travelling before the wind, for causing rotation of the hollow shaft 6, and the rod 11. Should the rotation of these last two mentioned elements exceed a predetermined speed, the governor arms 24 will be operated, by the belt connection, with the shaft 6, and the sleeve 26, will be drawn upwardly upon the shaft 23. This upward movement of the sleeve 26, will cause the link 30, to pivot the lever 29, for moving the rod 11, longitudinally through the bore of the shaft 6. This movement of the rod 11, will pivot the bell-crank lever 13, for moving the rod 17, longitudinally of the arms 7, the said arms being provided with vertically aligned, elongated slots 39 within which the rod 17 moves. This movement of the rod 17 will cause the abutments 9 to pivot and the outer abutments will be moved out of engagement with the outer blade 8, whereupon this blade will be permitted to pivot for furnishing no resistance to the air and thereby cutting down the speed of rotation of the shaft 6 and rod 11. Should the wind increase in velocity, the governor arms 27 will be pivoted still further, and the second pair of abutments will be moved out of their operative positions for permitting the second blade 8 to swing for furnishing no resistance to the air. It will be seen that still further movement of the arms 24 will cause the last pair of abutments 9 to be moved out of engagement with the remaining blade 8 for placing the wind motor out of commission. It will, also, be seen that the manually operable lever 37 may be actuated for controlling the number of blades retained in operation.

It is now believed that the construction, operation, and manner of assembling the various elements embodying this invention will be completely understood from the above detailed description.

It is to be understood that the form of this invention herewith shown and described is to be taken as the preferred example of the same, and that various changes in the shape, size, and arrangement of parts may be resorted to, without departing from the spirit of the invention or the scope of the subjoined claims.

Having thus described the invention, what I claim is:—

1. In a wind motor, a vertical bearing member, a hollow shaft journaled therein, a shaft longitudinally shiftably mounted in the bore of the hollow shaft, a wheel secured to the upper end of the hollow shaft, said wheel embodying a plurality of radial arms arranged in vertical pairs, feathering blades carried by the pairs of arms, and shiftable devices carried by the arms cooperating with the edges of the blades, for controlling the operation of the latter, said shiftable devices being actuated by movement of the longitudinally shiftable shaft.

2. In a wind motor, a vertical bearing member, a hollow shaft journaled therein, a second shaft shiftably mounted in the bore of the hollow shaft, a wind wheel secured to the upper end of the hollow shaft, swinging blades mounted on said wheel, pivotal abutments on the wheel cooperating with the edges of the blades to hold the same in operative positions, and means connecting the abutments to the second shaft, adapted to operate for controlling the speed of rotation of the shaft.

3. In a wind motor, a bearing member, a shaft journaled in said bearing, a wind wheel mounted upon said shaft, a plurality of sets of feathering blades carried by said wheel, a pair of pivotal abutments for each blade in each set, and means controlled by the speed of the shaft, for pivoting the abutments for the different blades in each set, into inoperative positions in a step by step manner, for reducing the speed of the shaft.

4. In a wind motor, a vertical bearing member, a rotatable shaft journaled in said bearing member, a wind wheel carried by said shaft, a plurality of blades hingedly carried by said wheel, a pair of bell crank shape abutments for each blade, pivotally carried by said wheel, a governor, means for driving said governor from said shaft, and means for connecting said governor to said abutments so that the latter will be moved into inoperative positions successively, for causing the blades to become inoperative in a step by step manner.

In testimony whereof I affix my signature.

STEFAN ZGLICZYNSKI.